US011550875B2

(12) United States Patent
Aoi et al.

(10) Patent No.: US 11,550,875 B2
(45) Date of Patent: Jan. 10, 2023

(54) PROCESSING SYSTEM AND METHOD FOR COMPARATIVELY ANALYZING DATA

(71) Applicant: Tokyo Electron Limited, Tokyo (JP)

(72) Inventors: Ryota Aoi, Hokkaido (JP); Kenichi Kobayashi, Hokkaido (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 166 days.

(21) Appl. No.: 16/901,046

(22) Filed: Jun. 15, 2020

(65) Prior Publication Data

US 2020/0401654 A1 Dec. 24, 2020

(30) Foreign Application Priority Data

Jun. 21, 2019 (JP) .............................. JP2019-115837

(51) Int. Cl.
*G06F 17/18* (2006.01)
*G06T 11/20* (2006.01)

(52) U.S. Cl.
CPC ............ *G06F 17/18* (2013.01); *G06T 11/206* (2013.01)

(58) Field of Classification Search
CPC .......... G06F 17/00; G06F 17/18; G06F 17/40; G06F 11/00; G06F 11/3072; G06T 11/00; G06T 11/206; G06N 5/00; G06N 5/022; G06N 5/02
See application file for complete search history.

(56) References Cited

U.S. PATENT DOCUMENTS

2009/0125276 A1* 5/2009 Koizumi ............ G05B 23/0221
702/182
2012/0023429 A1* 1/2012 Medhi ................... G06F 11/323
715/772

FOREIGN PATENT DOCUMENTS

JP 4180960 B2 * 11/2008
JP 2010-505209 A 2/2010

* cited by examiner

*Primary Examiner* — Daniel R Miller
*Assistant Examiner* — Matthew W. Baca
(74) *Attorney, Agent, or Firm* — Venjuris, P.C.

(57) ABSTRACT

A processing system includes: a first statistical operator configured to divide data output from each sensor of a target apparatus according to each processing division of a processing performed by the target apparatus, and perform a statistical operation for each processing division; a second statistical operator configured to divide data output from each sensor of a comparative apparatus according to each processing division of the processing performed by the comparative apparatus, and perform a statistical operation for each processing division; a calculator configured to calculate a difference value between a result of the statistical operation performed by the first statistical operator and a result of the statistical operation performed by the second statistical operator, for each processing division; and a display controller configured to display the difference value for each processing division in a graph.

10 Claims, 10 Drawing Sheets

FIG. 10 ately Analyzing Data

PROCESSING SYSTEM AND METHOD FOR COMPARATIVELY ANALYZING DATA

CROSS-REFERENCE TO RELATED APPLICATIONS

This application is based on and claims priority from Japanese Patent Application No. 2019-115837 filed on Jun. 21, 2019 with the Japan Patent Office, the disclosure of which is incorporated herein in its entirety by reference.

TECHNICAL FIELD

The present disclosure relates to a processing system and a processing method.

BACKGROUND

In the related art, in various processing apparatuses such as, for example, a substrate processing apparatus, an operation of a target apparatus is verified in the manner that a "data checking task" for checking data output from a sensor in the apparatus is performed by executing a processing according to a general method at the time of booting the apparatus.

Meanwhile, for a processing apparatus such as, for example, a substrate processing apparatus where a large number of sensors (e.g., 1,500 sensors) exist, and a period of data sampling is short (e.g., a period of 0.1 second), the number of data points becomes enormous when the processing according to the general method is executed. See, for example, Japanese Patent Laid-Open Publication No. 2010-505209.

SUMMARY

According to an aspect, a processing system includes: a first statistical operator configured to divide data output from each sensor of a target apparatus according to each processing division of a processing performed by the target apparatus, and perform a statistical operation for each processing division; a second statistical operator configured to divide data output from each sensor of a comparative apparatus according to each processing division of the processing performed by the comparative apparatus, and perform a statistical operation for each processing division; a calculator configured to calculate a difference value between a result of the statistical operation performed by the first statistical operator and a result of the statistical operation performed by the second statistical operator, for each processing division; and a display controller configured to display the difference value for each processing division in a graph.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, each embodiment will be described with reference to the accompanying drawings. In the descriptions and the drawings herein, components having a substantially similar functional configuration will be denoted by the same reference numerals, and overlapping descriptions thereof will be omitted.

First Embodiment

Outline of Tasks Performed at Time of Booting Target Apparatus

Figure 1:
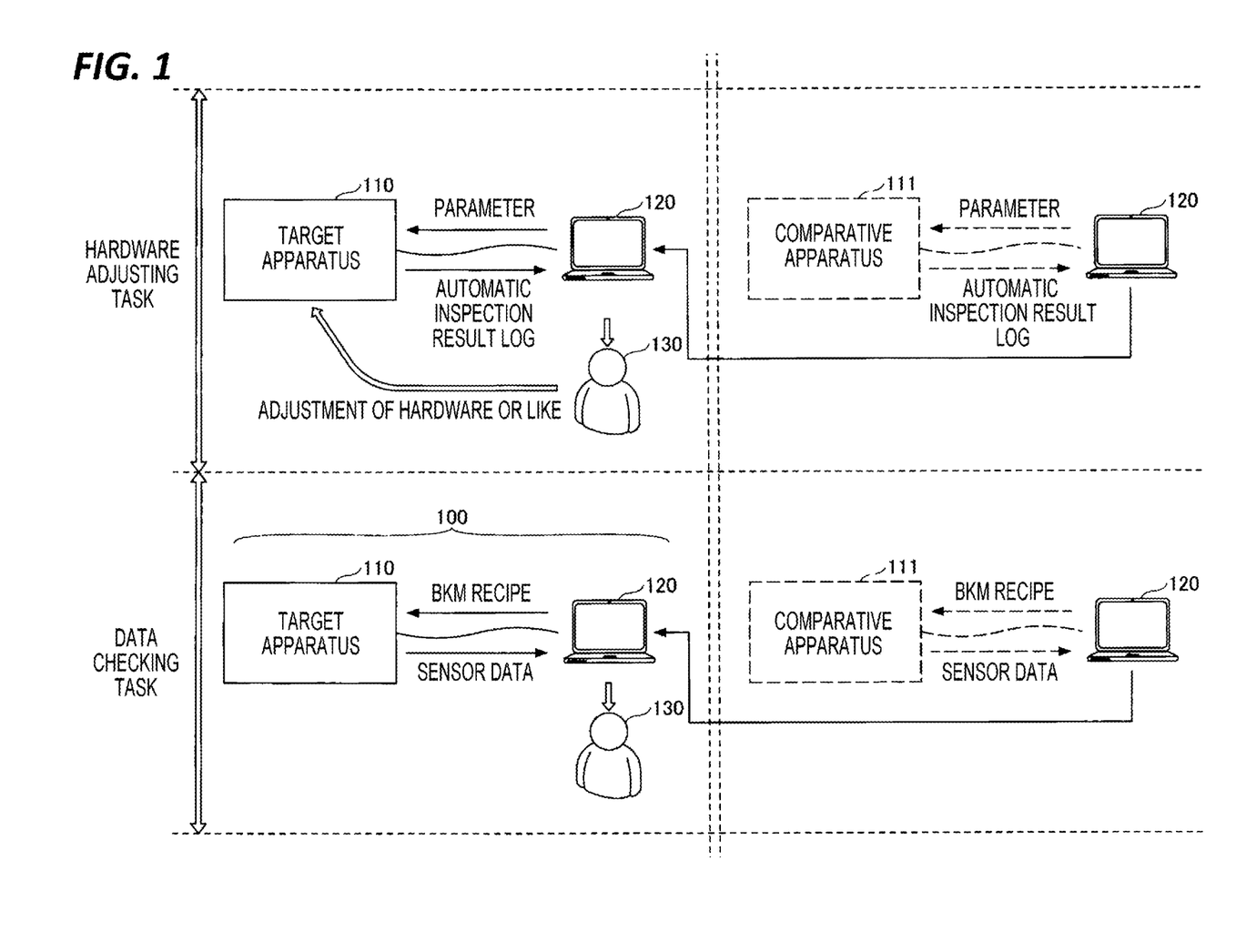
FIG. 1 is a view illustrating an outline of tasks performed at the time of booting a target apparatus.

First, descriptions will be made on an outline of tasks performed at the time of booting a target apparatus in a case where the target apparatus is a substrate processing apparatus (a processing apparatus that processes a substrate such as a wafer). FIG. 1 is a view illustrating the outline of tasks performed at the time of booting the target apparatus. As illustrated in FIG. 1, the tasks performed in a case where the target apparatus is a substrate processing apparatus include, for example, a hardware adjusting task and a data checking task.

In the hardware adjusting task, first, an analysis device 120 is connected to a target apparatus 110, and sets predetermined parameters for the target apparatus 110. Then, the target apparatus 110 executes an automatic inspection, and generates an automatic inspection result log. The analysis device 120 acquires the automatic inspection result log generated by the target apparatus 110.

Here, it is assumed that the analysis device 120 is connected in advance to a comparative apparatus 111, sets predetermined parameters for the comparative apparatus 111, and acquires an automatic inspection result log from the comparative apparatus 111. In addition, the comparative apparatus 111 indicates a substrate processing apparatus which is the same in type as the target apparatus 110 and has been verified to operate correctly.

When the analysis device 120 acquires the automatic inspection result log generated by the target apparatus 110, an operator 130 compares the acquired automatic inspection result log with the automatic inspection result log acquired in advance from the comparative apparatus 111, and determines whether a difference exists. When it is determined that a difference exists, the operator 130 adjusts the hardware or the like of the target apparatus 110.

When the operator 130 completes the adjustment of the hardware or the like, the analysis device 120 sets parameters for the target apparatus 110 again, and acquires an automatic inspection result log generated as a result of the automatic inspection performed by the target apparatus 110.

In the hardware adjusting task, the processes described above (adjusting the hardware or the like, setting parameters, and performing the automatic inspection) are repeated until the difference from the automatic inspection result log acquired from the comparative apparatus 111 disappears, and the data checking task is performed when it is determined that the difference has disappeared.

In the data checking task, first, the analysis device 120 is connected to the target apparatus 110 so as to construct a processing system 100 according to the present embodiment, and then, causes the target apparatus 110 to perform a processing according to a general method.

Specifically, first, the analysis device 120 sets a BKM (best known method) recipe in the target apparatus 110, and the target apparatus 110 executes the set BKM recipe. At this time, the analysis device 120 acquires sensor data output by each sensor in the target apparatus 110 during the execution of the BKM recipe.

Subsequently, the operator 130 inspects an object generated as a result of the execution of the BKM method in the target apparatus 110. At this time, when the object satisfies a predetermined condition, the data checking task is ended. Meanwhile, when the object does not satisfy the predetermined condition, the operator 130 checks the sensor data acquired by the analysis device 120.

Here, it is assumed that the analysis device 120 is connected in advance to the comparative apparatus 111, and acquires sensor data generated when the comparative apparatus 111 executes the BKM recipe.

Thus, the operator 130 checks the sensor data acquired from the target apparatus 110 while comparing the sensor data with the sensor data acquired in advance from the comparative apparatus 111.

Here, in order to improve the efficiency of the data checking task performed by the operator 130, first, the analysis device 120 according to the present embodiment divides the sensor data (the sensor data from each of the target apparatus 110 and the comparative apparatus 111) according to processing divisions (steps) defined in the BKM recipe.

Subsequently, the analysis device 120 according to the present embodiment performs a statistical operation for each sensor data divided according to the processing divisions, so as to summarize each sensor data for each processing division.

Subsequently, the analysis device 120 according to the present embodiment calculates a difference value of each sensor data summarized for each processing division between the target apparatus 110 and the comparative apparatus 111 for each processing division, and displays the calculated difference value in a graph.

As described above, in the analysis device 120 according to the present embodiment, the sensor data is summarized in units of the processing division. As a result, the operator 130 does not need to check all of the enormous number of data points included in the sensor data, so that the operator 130 may estimate the sensor data to be checked while looking through the entire sensor data.

Further, in the analysis device 120 according to the present embodiment, the sensor data of the target apparatus 110 and the sensor data of the comparative apparatus 111 are meaningfully compared with each other in units of the processing division. Accordingly, the operator 130 may improve the accuracy for estimating the sensor data to be checked.

As a result, with the analysis device 120 according to the present embodiment, the efficiency of the data checking task may be improved.

Hardware Configuration of Analysis Device

Figure 2:
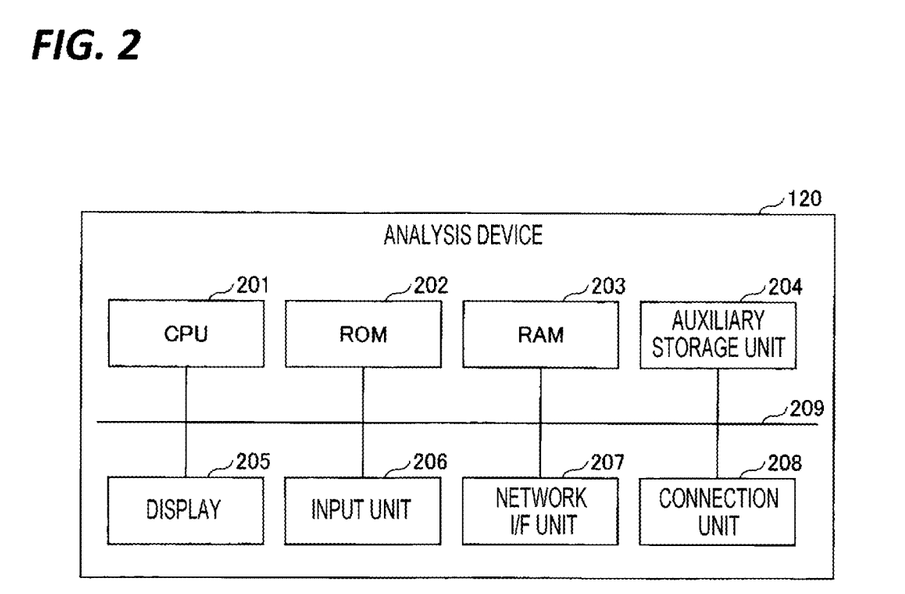
FIG. 2 is a view illustrating an example of a hardware configuration of an analysis device.

Next, the hardware configuration of the analysis device 120 will be described. FIG. 2 is a view illustrating an example of the hardware configuration of the analysis device. As illustrated in FIG. 2, the analysis device 120 includes a central processing unit (CPU) 201, a read only memory (ROM) 202, and a random access memory (RAM) 203. The CPU 201, the ROM 202, and the RAM 203 make up a so-called computer.

The analysis device 120 further includes an auxiliary storage unit 204, a display 205, an input unit 206, a network interface (I/F) unit 207, and a connection unit 208. The hardware components of the analysis device 120 are connected to each other via a bus 209.

The CPU 201 is a device that executes various programs (e.g., an analysis program to be described later) installed in the auxiliary storage unit 204. The ROM 202 is a nonvolatile memory. The ROM 202 functions as a main storage device that stores various programs, data or the like necessary when the CPU 201 executes the various programs installed in the auxiliary storage unit 204. Specifically, the ROM 202 stores, for example, a boot program such as a BIOS (basic input/output system) or an EFI (extensible firmware interface).

The RAM 203 is a volatile memory such as a dynamic random access memory (DRAM) or a static random access memory (SRAM). The RAM 203 functions as a main storage device that provides a work area where the various programs installed in the auxiliary storage unit 204 are deployed when the programs are executed by the CPU 201.

The auxiliary storage unit 204 is an auxiliary storage device that stores various programs or information used when the various programs are executed. A data storage unit to be described later is implemented by the auxiliary storage unit 204.

The display 205 is, for example, a display device that displays a screen for displaying a difference value calculated by the analysis device 120 in a graph (e.g., a comparison result display screen to be described later). The input unit 206 is an input device used when the operator 130 inputs various instructions to the analysis device 120.

The network I/F unit 207 is a communication device that is connected to an external network (not illustrated). The connection unit 208 is a connection device that is connected to a substrate processing apparatus such as the target apparatus 110 or the comparative apparatus 111.

Functional Configuration of Analysis Device

Figure 3:
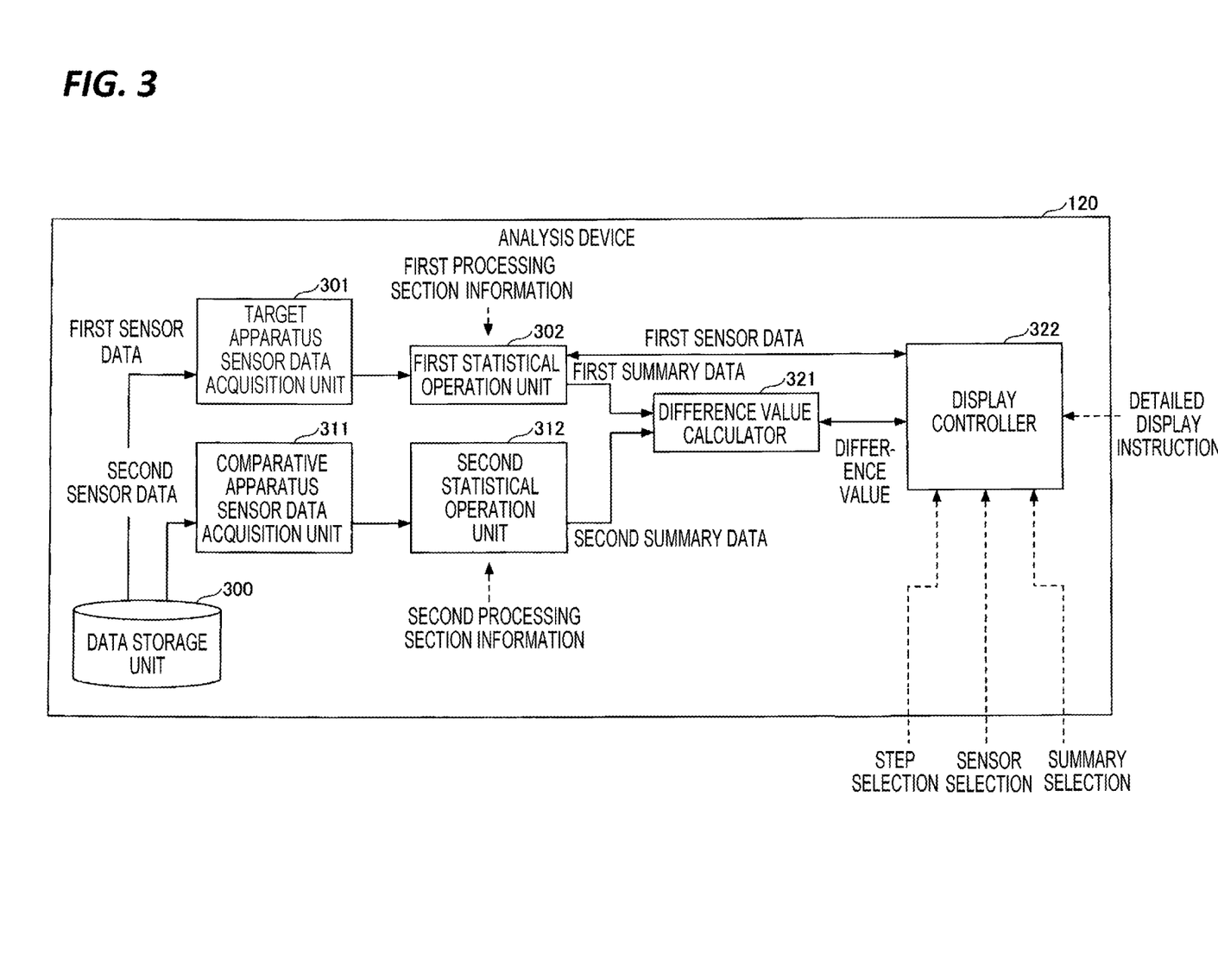
FIG. 3 is a view illustrating an example of a functional configuration of the analysis device.

Next, the functional configuration of the analysis device 120 will be described (hereinafter, the functions executed for the data checking task will be described). FIG. 3 is a view illustrating an example of the functional configuration of the analysis device. As illustrated in FIG. 3, the analysis device 120 executes the analysis program so as to function as a target apparatus sensor data acquisition unit 301, a first statistical operation unit 302, a comparative apparatus sensor data acquisition unit 311, and a second statistical operation unit 312, a difference value calculator 321, and a display controller 322.

In addition, it is assumed that a data storage unit 300 illustrated in FIG. 3 stores:

sensor data output by each sensor in the target apparatus 110 during the execution of the BKM recipe by the target apparatus 110 (first sensor data), and sensor data output by each sensor in the comparative apparatus 111 during the execution of the BKM recipe by the comparative apparatus 111 (second sensor data).

The target apparatus sensor data acquisition unit 301 reads out the first sensor data from the data storage unit 300, and notifies the first sensor data to the first statistical operation unit 302.

The first statistical operation unit 302 acquires first processing section information which is information of a processing section when the target apparatus 110 executes each processing division (each step) defined in the BKM recipe, from the target apparatus 110. The processing section information represents an execution start timing and an execution completion timing when each processing division is executed.

The first statistical operation unit 302 divides the first sensor data according to the processing divisions, by using the acquired first processing section information. Further, the first statistical operation unit 302 performs a statistical operation (an operation of a minimum value, a maximum value, an average value, or a standard deviation (3σ) for each processing division, so as to summarize the first sensor data and generate first summary data. In this way, the first statistical operation unit 302 summarizes the first sensor data in units of the processing division, so that it is unnecessary to check all of the enormous number of sensor data points.

The comparative apparatus sensor data acquisition unit 311 reads out the second sensor data from the data storage unit 300, and notifies the second sensor data to the second statistical operation unit 312.

The second statistical operation unit 312 acquires second processing section information which is information of a processing section when the comparative apparatus 111 executes each processing division (each step) defined in the BKM recipe, from the comparative apparatus 111.

Even when the same BKM recipe is executed, a processing time required to execute each processing division may not be the same. When each processing division is executed, the execution start timing and the execution completion timing differ in the target apparatus 110 and the comparative apparatus 111. This is because, for example, in a case where a condition for the shift to a subsequent processing division is defined by a reference temperature, pressure or the like (rather than a reference time), a timing for the shift to a subsequent processing division in the target apparatus 110 may not be exactly the same as that in the comparative apparatus 111. Thus, the second statistical operation unit 312 acquires second processing section information which is different from the first processing section information, from the comparative apparatus 111.

Further, the second statistical operation unit 312 divides the second sensor data according to the processing divisions, by using the acquired second processing section information. Further, the second statistical operation unit 312 performs a statistical operation (an operation of a minimum value, a maximum value, an average value or a standard deviation (3σ) for each processing division, so as to summarize the second sensor data and generate second summary data.

The difference value calculator 321 calculates a difference value between the result of the statistical operation performed by the first statistical operation unit 302 and the result of the statistical operation performed by the second statistical operation unit 312, for each processing division. In this way, the difference value calculator 321 calculates a difference value for each processing division, so that the summary data may be meaningfully compared with each other in units of the processing division.

The display controller 322 displays the difference value calculated by the difference value calculator 321 for each processing division, in a graph. Thus, the operator 130 may estimate the sensor data to be checked, while looking through the entire sensor data.

In order to display a difference value for each processing division in a graph, the display controller 322 receives a selection of a predetermined processing division (step) (step selection instruction) from the operator 130. Accordingly, the display controller 322 may calculate a difference value for the predetermined processing division, and display the difference value in a graph (a difference value for a processing division which does not need to be checked may be excluded in displaying a graph).

Further, in order to display a difference value for each processing division in a graph, the display controller 322 receives a selection of a predetermined sensor (sensor selection instruction) from the operator 130. Accordingly, the display controller 322 may calculate a difference value for each processing division in the predetermined sensor, and display the difference value in a graph (a difference value for a sensor which does not need to be checked may be excluded in displaying a graph).

Further, in order to display a difference value for each processing division in a graph, the display controller 322 receives a selection of a type (summary) of a statistical operation (summary selection instruction) from the operator 130. Accordingly, the display controller 322 may calculate a difference value for a result of a statistical operation of any one of the minimum value, the maximum value, the average value, and 3σ, and display the difference value in a graph.

After calculating a difference value for each processing division and displaying the difference value in a graph, the display controller 322 receives a detailed display instruction from the operator 130. When the detailed display instruction is received, the display controller 322 reads out the sensor data in the processing division (the first sensor data before the statistical operation is performed), from the first statistical operation unit 302, and displays the sensor data. As a result, for example, the operator 130 may drill down and check an estimated difference value, from the difference values displayed in a graph.

Specific Example of Processing Performed by Analysis Device

Next, a specific example of the processing performed by the analysis device 120 (here, the statistical operation processing, the difference value calculation processing, and the display processing performed by the analysis device 120) will be described.

(1) Specific Example of Statistical Operation Processing

(1-1) Statistical Operation Processing for First Sensor Data

Figure 4:
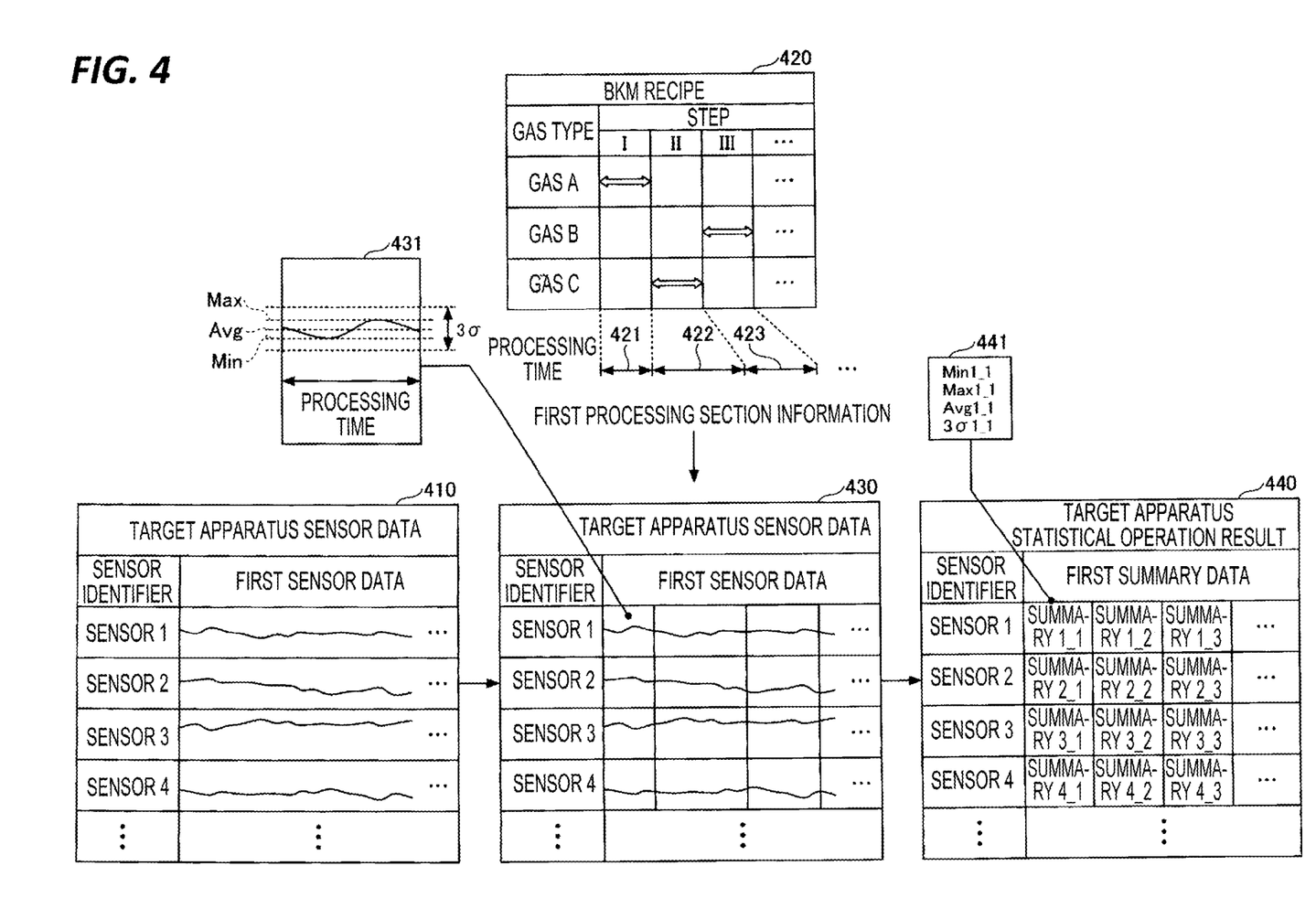
FIG. 4 is a first view illustrating a specific example of a statistical operation processing performed by the analysis device.

First, a specific example of the statistical operation processing performed on the first sensor data by the analysis device 120 will be described. FIG. 4 is a first view illustrating the specific example of the statistical operation processing performed by the analysis device.

In FIG. 4, target apparatus sensor data 410 is an example of a data structure including the first sensor data read out from the data storage unit 300 by the target apparatus sensor data acquisition unit 301. As represented in FIG. 4, the target apparatus sensor data 410 has information items "Sensor Identifier" and "First Sensor Data."

The item "Sensor Identifier" stores an identifier for identifying each sensor in the target apparatus 110. The item "First Sensor Data" stores the first sensor data output by each sensor in the target apparatus 110.

In FIG. 4, a BKM recipe 420 is an example of a recipe set in the target apparatus 110 when the data checking task is performed. As represented in FIG. 4, the BKM recipe 420 has information items "Gas Type" and "Step."

The item "Gas Type" stores a type of a gas supplied to a processing space of the target apparatus 110. The item "Step" includes, for example, "I," "II," "III," . . . indicating step names, and a thick arrow is stored at a position corresponding to each step name, to indicate that any one type of gas is being supplied.

According to the example of FIG. 4, in the processing division (step) specified by the step name "I," a "gas A" indicating a gas type is supplied to the processing space. In the processing division (step) specified by the step name "II," a "gas C" indicating a gas type is supplied to the processing space. In the processing division (step) specified by the step name "III," a "gas B" indicating a gas type is supplied to the processing space.

As described above, the first statistical operation unit 302 acquires the first processing section information when each processing division (step) is executed (an execution start timing and an execution completion timing), from the target apparatus 110. In FIG. 4, the left and right ends of a thin arrow 421 on the time axis indicating a processing time represent the execution start timing and the execution completion timing of the processing division (step) specified by the step name "I." The length of the thin arrow 421 on the time axis indicating the processing time represents the processing time required to execute the processing division (step) specified by the step name "I."

Similarly, in FIG. 4, the left and right ends of a thin arrow 422 on the time axis indicating a processing time represent the execution start timing and the execution completion timing of the processing division (step) specified by the step name "II." The length of the thin arrow 422 represents the processing time required to execute the processing division (step) specified by the step name "II."

Similarly, in FIG. 4, the left and right ends of a thin arrow 423 on the time axis indicating a processing time represent the execution start timing and the execution completion timing of the processing division (step) specified by the step name "III." The length of the thin arrow 423 represents the processing time required to execute the processing division (step) specified by the step name "III."

As described above, the first statistical operation unit 302 divides the "first sensor data" of the target apparatus sensor data 410 according to the processing divisions (steps), by using the first processing section information. In FIG. 4, target apparatus sensor data 430 is obtained by dividing the "first sensor data" of the target apparatus sensor data 410 according to the processing divisions, by using the first processing section information.

Further, as described above, the first statistical operation unit 302 performs a statistical operation on the "first sensor data" divided according to the processing divisions, for each processing division. In FIG. 4, a target apparatus statistical operation result 440 is an example of a data structure including the first summary data generated as a result of the statistical operation performed by the first statistical operation unit 302.

In the target apparatus statistical operation result 440, "Summary 1_1" included in the "First Summary Data" is a result of the statistical operation performed on:

the first sensor data associated with the sensor identifier "Sensor 1" and the first sensor data divided according to the processing division specified by the step name "I" (see the reference numeral 431).

The example of FIG. 4 represents that "Summary 1_1" is generated including:

the minimum value (Min="Min1_1"),
the maximum value (Max="Max1_1"),
the average value (Avg="Avg1_1"), and
$3\sigma$ (="3σ1_1"), as a result of the statistical operation performed on the first sensor data indicated by the reference numeral 431 (see the reference numeral 441).

(1-2) Statistical Operation Processing on Second Sensor Data

Figure 5:
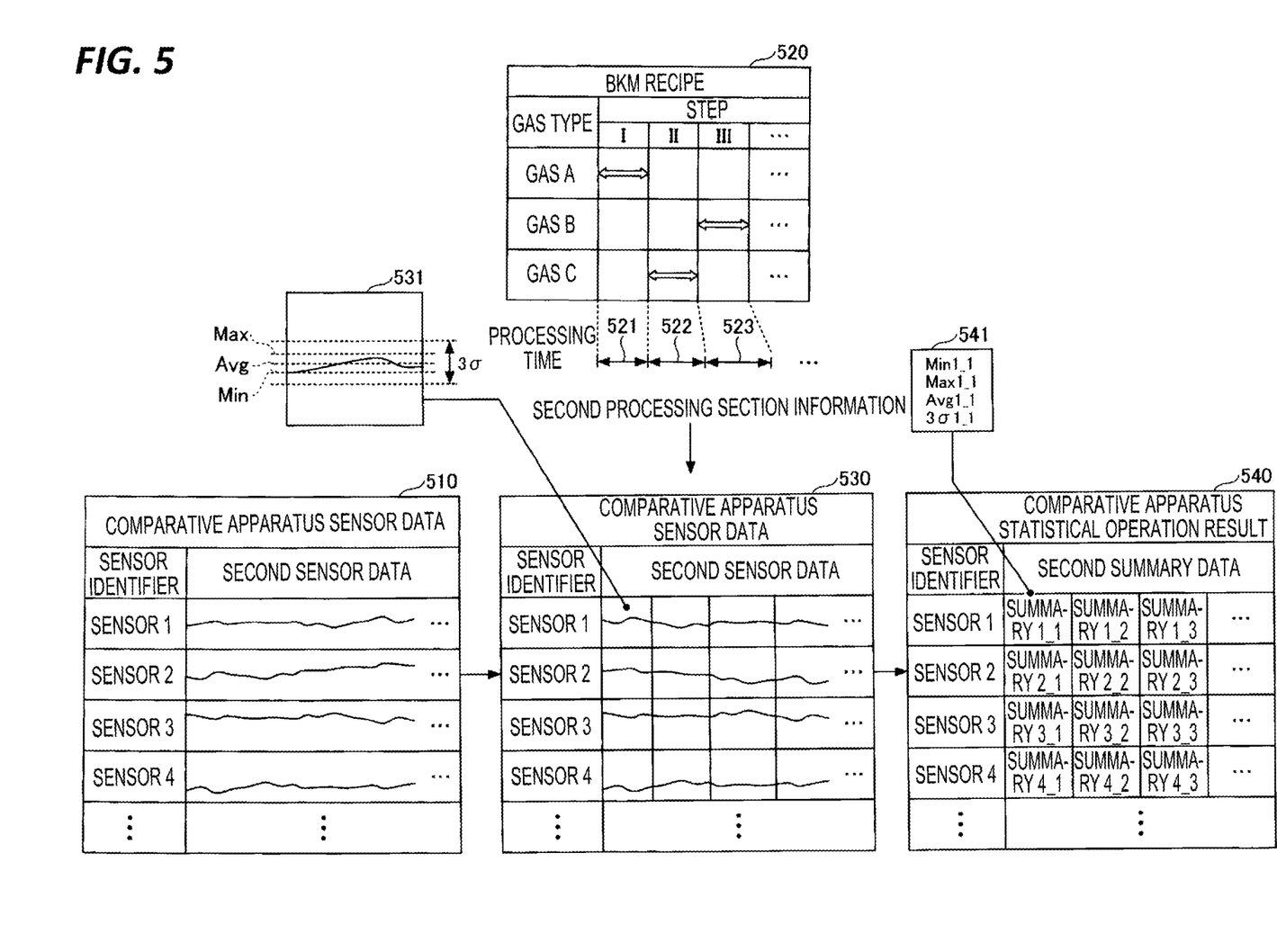
FIG. 5 is a second view illustrating a specific example of a statistical operation processing performed by the analysis device.

Next, a specific example of the statistical operation processing performed on the second sensor data by the analysis device 120 will be described. FIG. 5 is a second view illustrating the specific example of the statistical operation processing performed by the analysis device. Here, descriptions will be made focusing on differences from the specific example of the statistical operation processing represented in FIG. 4.

In FIG. 5, comparative apparatus sensor data 510 has the same data structure as that of the target apparatus sensor data 410, except that the comparative apparatus sensor data 510 stores the second sensor data, instead of the first sensor data. In FIG. 5, a BKM recipe 520 is the same as the BKM recipe 420 illustrated in FIG. 4.

Meanwhile, as illustrated in FIG. 5, the second statistical operation unit 312 acquires the second processing section information from the comparative apparatus 111. In FIG. 5, the left and right ends of a thin arrow 521 on the time axis indicating a processing time represent the execution start timing and the execution completion timing of the processing division (step) specified by the step name "I." The length of the thin arrow 521 represents the processing time required to execute the processing division (step) specified by the step name "I."

Similarly, in FIG. 5, the left and right ends of a thin arrow 522 on the time axis indicating a processing time represent the execution start timing and the execution completion timing of the processing division (step) specified by the step name "II." The length of the thin arrow 522 represents the processing time required to execute the processing division (step) specified by the step name "II."

Similarly, in FIG. 5, the left and right ends of a thin arrow 523 on the time axis indicating a processing time represent the execution start timing and the execution completion timing of the processing division (step) specified by the step name "III." The length of the thin arrow 523 represents the processing time required to execute the processing division (step) specified by the step name "III."

Here, the example of FIG. 5 represents that the processing times for the processing divisions (steps) specified by the step names "I" and "III" are the same between the target apparatus 110 and the comparative apparatus 111. Meanwhile, the example of FIG. 5 represents that the processing time for the processing division (step) specified by the step name "II" differs in the target apparatus 110 and the comparative apparatus 111.

As described above, the second statistical operation unit 312 divides the "second sensor data" of the comparative apparatus sensor data 510 according to the processing divisions (steps), by using the second processing section information. In FIG. 5, comparative apparatus sensor data 530 is obtained by dividing the "second sensor data" of the comparative apparatus sensor data 510 according to the processing divisions by using the second processing section information.

As described above, the second statistical operation unit 312 performs a statistical operation on the "second sensor data" divided according to the processing divisions, for each processing division. In FIG. 5, a comparative apparatus statistical operation result 540 is an example of a data structure including the second summary data generated as a result of the statistical operation performed by the second statistical operation unit 312.

In the comparative apparatus statistical operation result 540, "Summary 1_1" included in the "second summary data" is a result of the statistical operation performed on:
the second sensor data associated with the sensor identifier "Sensor 1," and
the second sensor data divided according to the processing division specified by the step name "I" (see the reference numeral 531).

The example of FIG. 5 represents that "Summary 1_1" is generated including:
the minimum value (Min="Min1_1"),
the maximum value (Max="Max1_1"),
the average value (Avg="Avg1_1"), and
$3\sigma$ (="3σ1_1"),
as a result of the statistical operation performed on the second sensor data indicated by the reference numeral 531 (see the reference numeral 541).

(2) Specific Example of Difference Value Calculation Processing

Figure 6:
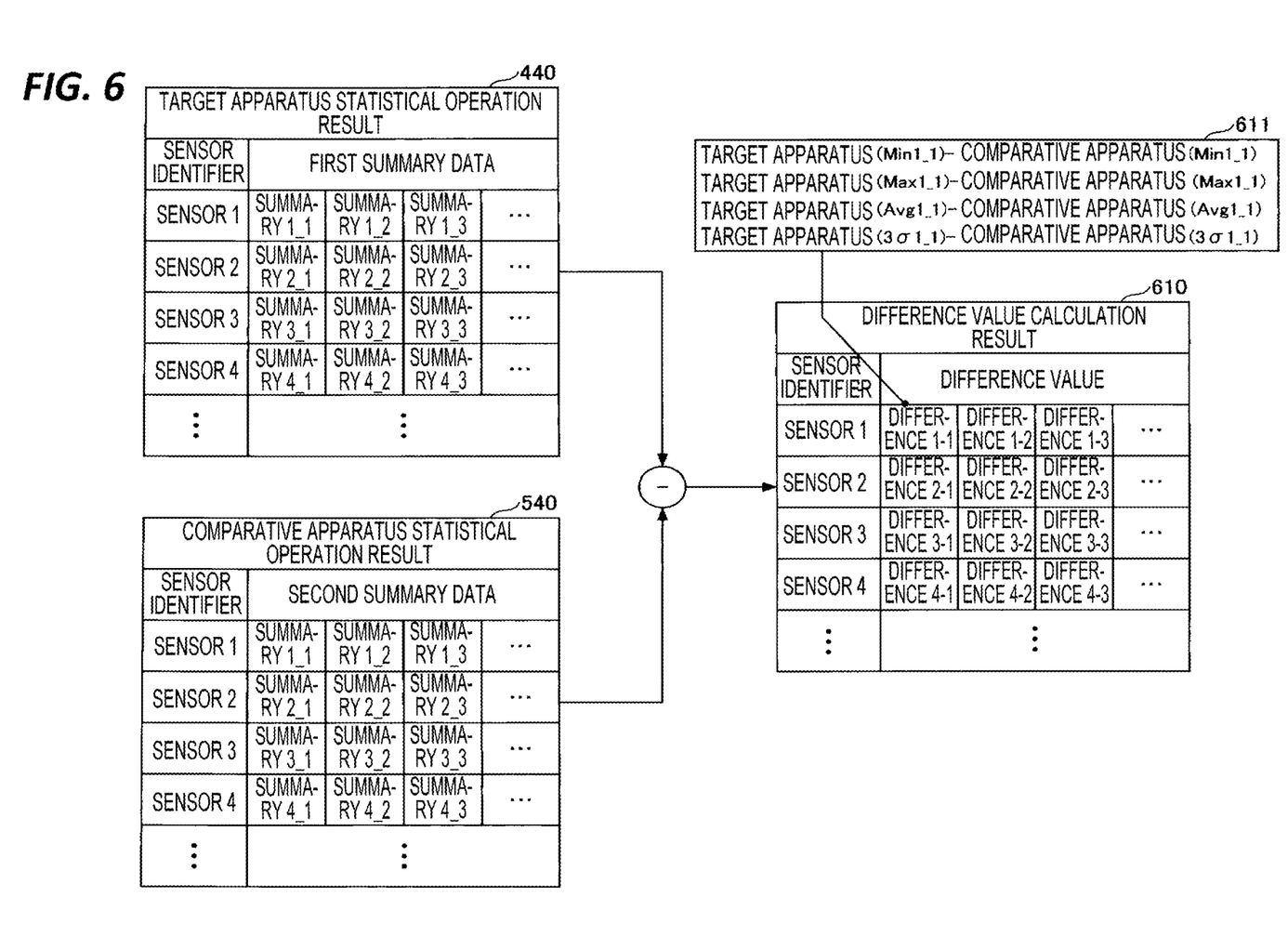
FIG. 6 is a view illustrating a specific example of a difference value calculation processing performed by the analysis device.

Next, a specific example of the difference value calculation processing performed by the analysis device 120 will be described. FIG. 6 is a view illustrating the specific example of the difference value calculation processing performed by the analysis device.

As illustrated in FIG. 6, the target apparatus statistical operation result 440 generated by the first statistical operation unit 302 and the comparative apparatus statistical operation result 540 generated by the second statistical operation unit 312 are subjected to the difference value calculation processing performed by the difference value calculator 321. In FIG. 6, a difference value calculation result 610 is an example of a data structure including difference values calculated when the difference value calculator 321 performs the difference value calculation processing on the target apparatus statistical operation result 440 and the comparative apparatus statistical operation result 540.

In the difference value calculation result 610, "Difference 1_1" represents difference values calculated based on:
the result of the statistical operation performed on the first sensor data divided according to the processing division specified by the step name "I," among the first sensor data of the sensor identifier "Sensor 1," and
the result of the statistical operation performed on the second sensor data divided according to the processing division specified by the step name "I," among the second sensor data of the sensor identifier "Sensor 1."

As illustrated in FIG. 6, the difference values of "Difference 1_1" include:
a difference value of the minimum value ((Min1_1 of target apparatus)−(Min1_1 of comparative apparatus)),
a difference value of the maximum value ((Max1_1 of target apparatus)−(Max1_1 of comparative apparatus)),
a difference value of the average value ((Avg1_1 of target apparatus)−(Avg1_1 of comparative apparatus)), and
a difference value of $3\sigma$ ((3σ1_1 of target apparatus)−(3σ1_1 of comparative apparatus)),
(see the reference numeral 611).

(3) Specific Example of Display Processing

Figure 7:
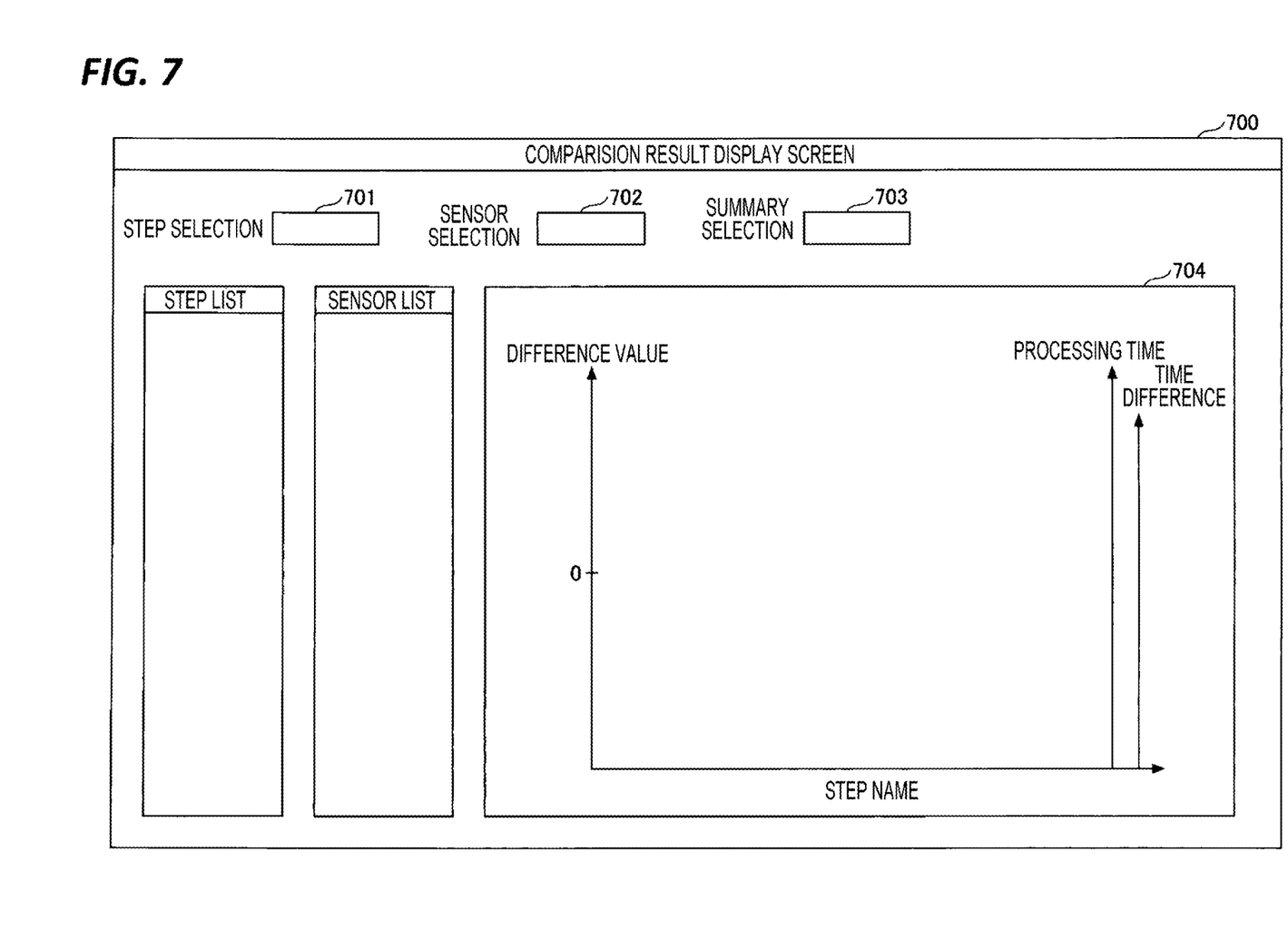
FIG. 7 is a view illustrating an example of a comparison result display screen.

Next, a specific example of the display processing performed by the analysis device 120 will be described with reference to the comparison result display screen. FIG. 7 is a view illustrating an example of the comparison result display screen.

As illustrated in FIG. 7, a comparison result display screen 700 displays reception fields for receiving instructions from the operator 130. The reception fields receive a selection of a calculation target which is subjected to the difference value calculation or a selection of a display target to be displayed in a graph among the calculated difference values.

Specifically, the comparison result display screen 700 displays a reception field 701 for receiving a processing division (step) selected by the operator 130 from the processing divisions (steps) defined in the BKM recipe 420 (step selection instruction).

Further, the comparison result display screen 700 displays a reception field 702 for receiving a sensor selected by the operator 130 from the sensors in the target apparatus 110 (sensor selection instruction).

Further, the comparison result display screen 700 displays a reception field 703 for receiving a type of a statistical operation selected by the operator 130 from the types (summaries) of the statistical operations (summary selection instruction).

Further, as illustrated in FIG. 7, the comparison result display screen 700 displays a graph display field 704 for displaying a difference value for each processing division in a graph. As illustrated in FIG. 7, in the graph display field 704, the horizontal axis represents the step name that specifies each processing division (step) defined in the BKM recipe 420. In the graph display field 704, the left vertical axis represents a difference value. In the graph display field 704, the right vertical axes represent a processing time and a time difference.

In the substrate processing apparatus, even when the same processing division (step) is performed, the result of the statistical operation differs in a case where the processing time is long and in a case where the processing time is short. Thus, the display controller 322 also displays the processing time of each processing division when displaying the difference value based on the result of the statistical operation in a graph. As a result, the operator 130 may also check the processing time when checking the difference value based on the result of the statistical operation.

For the same processing division among the processing divisions defined in the BKM recipe 420, the display controller 322 displays a time difference between the processing time required when the target apparatus 110 executes the processing division and the processing time required when the comparative apparatus 111 executes the processing division. As a result, the operator 130 may also check the time difference of the processing time when checking the difference value based on the result of the statistical operation.

Figure 8:
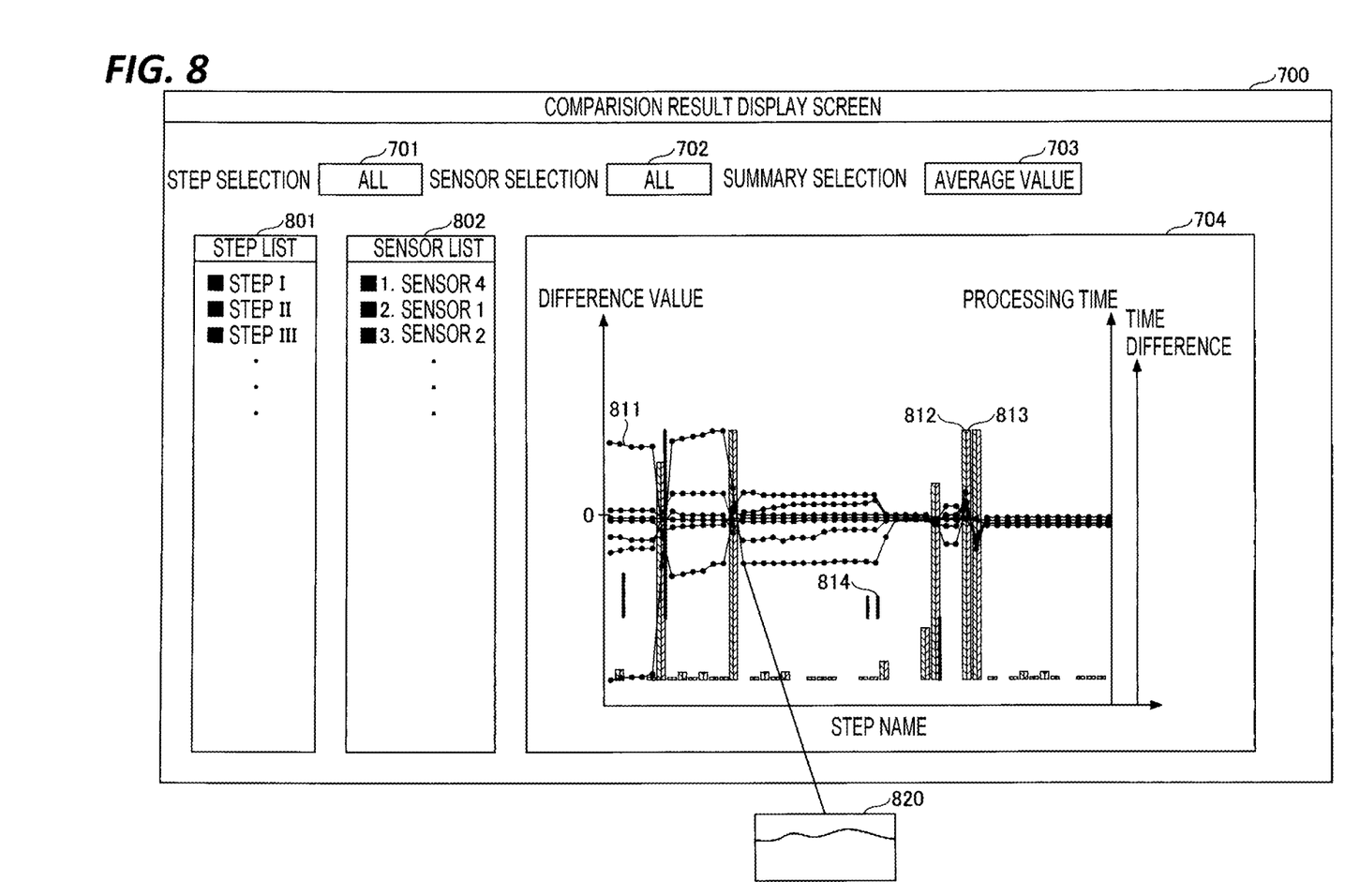
FIG. 8 is a first view illustrating an example of a display of graphs on the comparison result display screen.

Next, an example of a display of graphs on the comparison result display screen 700 will be described. FIG. 8 is a first view illustrating the example of the display of graphs on the comparison result display screen.

In the graph display field 704 of the comparison result display screen 700 of FIG. 8, for example, a line graph 811 represents a difference value of the average value for each processing division of a sensor having a predetermined sensor identifier. Each circle on the line graph 811 represents the difference value in each processing division.

In the graph display field 704, for example, a bar graph 812 represents a processing time required by the target apparatus 110 when a predetermined processing division is executed, and a bar graph 813 represents a processing time required by the comparative apparatus 111 when the predetermined processing division is executed.

In the graph display field 704, for example, a bar graph 814 represents a time difference between the processing time required by the target apparatus 110 and the processing time required by the comparative apparatus 111 when the predetermined processing division is executed.

As illustrated in FIG. 8, a step list display field 801 displays step names included in the "Step" of the BKM recipe 420 in an order of execution. In the example of FIG. 8, since "all" is selected in the reception field 701, the step list display field 801 displays all of the step names included in the "Step" of the BKM recipe 420. In a case where "main" is selected in the reception field 701, the step list display field 801 displays step names of predetermined main steps among the steps included in the "Step" of the BKM recipe 420.

As illustrated in FIG. 8, a sensor list display field 802 displays an identifier for identifying each sensor in the target apparatus 110. In the example of FIG. 8, since "all" is selected in the reception field 702, the sensor list display field 802 displays all identifiers for identifying the respective sensors in the target apparatus 110. In a case where "main" is selected in the reception field 702, the sensor list display field 802 displays identifiers for identifying predetermined main sensors among the sensors in the target apparatus 110.

It is assumed that the identifiers displayed in the sensor list display field 802 are arranged in an order according to a cumulative value of difference values. The cumulative value of difference values refers to a value obtained by accumulating difference values in each processing division for each sensor. When "all" is selected in the reception field 701, the cumulative value of difference values is a value obtained by accumulating difference values in all of the processing divisions. Meanwhile, when "main" is selected in the reception field 701, the cumulative value of difference values is a value obtained by accumulating difference values in predetermined main processing divisions.

The graph display field 704 may be configured to display only line graphs that correspond to sensors identified by a top "m" number of identifiers among the identifiers arranged in the sensor list display field 802 (m is an arbitrary integer).

In the line graphs displayed in the graph display field 704, each circle that represents a difference value of each processing division is associated with the first sensor data divided into the corresponding processing division of the corresponding sensor (first sensor data before the statistical operation).

Thus, when a circle on the line graphs is selected, the first sensor data associated with the selected circle (e.g., first sensor data 820) is displayed. Accordingly, the operator 130 may drill down an estimated difference value, among the difference values represented by the circles on the line graphs in the graph display field 704, so as to check the detailed first sensor data.

Data Checking Processing

Figure 9:
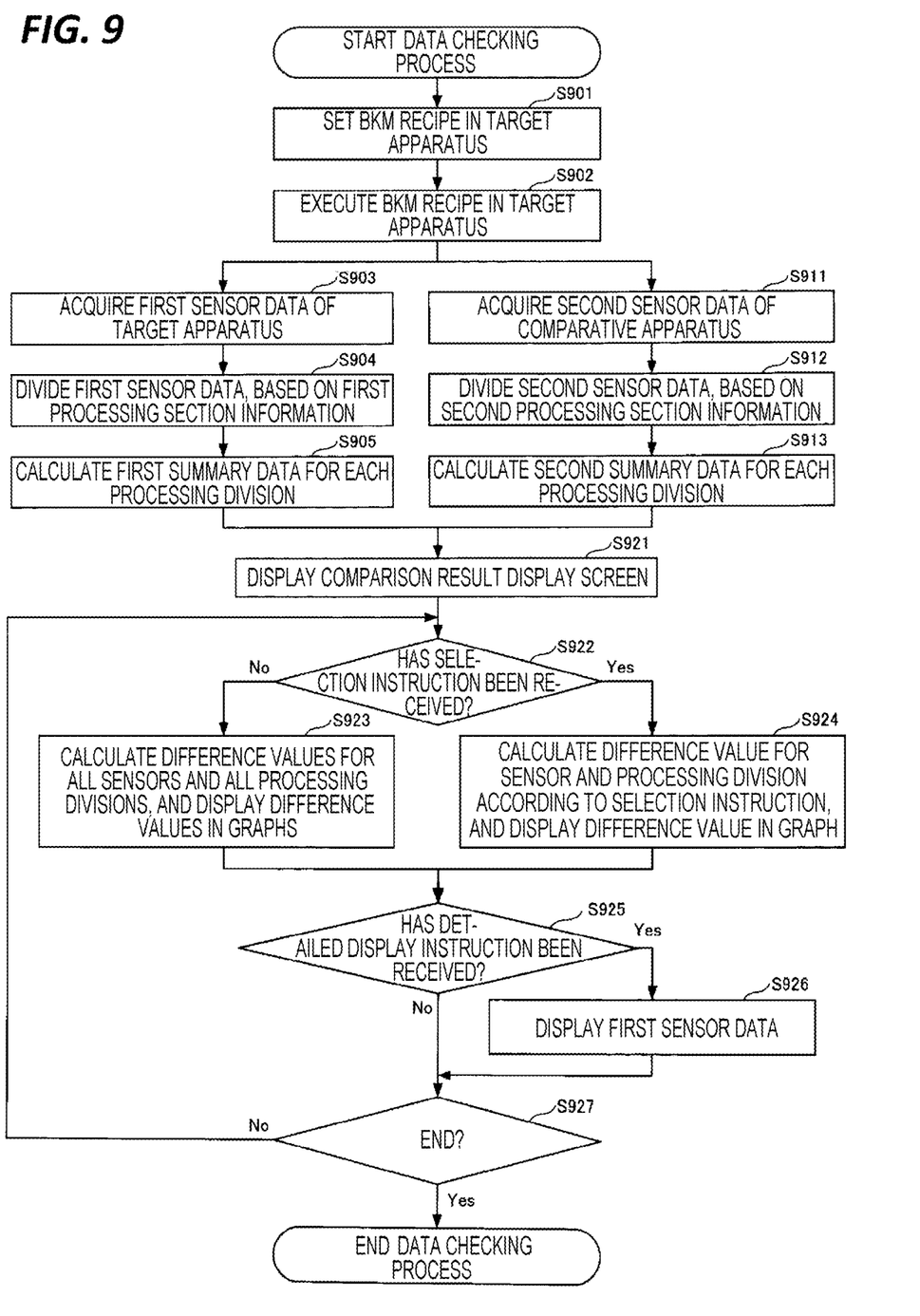
FIG. 9 is a flowchart illustrating a flow of a data checking process.

Next, the details of the data checking processing performed by the analysis device 120 will be described. FIG. 9 is a flowchart illustrating the flow of the data checking processing.

In step S901, the analysis device 120 sets the BKM recipe 420 in the target apparatus 110.

In step S902, the target apparatus 110 executes the BKM recipe 420.

In step S903, the analysis device 120 acquires the first sensor data output from the target apparatus 110 during the execution of the BKM recipe 420.

In step S904, the analysis device 120 divides the first sensor data of the target apparatus 110 according to the process divisions, by using the first processing section information when the target apparatus 110 executes the BKM recipe 420.

In step S905, the analysis device 120 performs a statistical operation processing on the first sensor data for each processing division, so as to calculate the first summary data.

In step S911, the analysis device 120 acquires the second sensor data output from the comparative apparatus 111 during the execution of the BKM recipe 420.

In step S912, the analysis device 120 divides the second sensor data of the comparative apparatus 111 according to the processing divisions, by using the second processing section information when the comparative apparatus 111 executes the BKM recipe 420.

In step S913, the analysis device 120 performs a statistical operation processing on the second sensor data for each processing division, so as to calculate the second summary data.

In step S921, the analysis device 120 displays the comparison result display screen. In step S922, the analysis device 120 determines whether any one selection instruction (the step selection instruction, the sensor selection instruction or the summary selection instruction) has been received.

When it is determined in step S922 that no selection instruction has been received (No in step S922), the process proceeds to step S923. In step S923, the analysis device 120 calculates a difference value of the average value for all of the sensors and for all of the processing divisions, based on a default instruction (step selection instruction="all," sensor selection instruction="all," and summary selection instruction="average value"), and displays the difference values in graphs.

Meanwhile, when it is determined in step S922 that any one selection instruction has been received (Yes in step S922), the process proceeds to step S924. In step S924, the analysis device 120 calculates a difference value for the sensor and the processing division according to the received selection instruction, and displays the difference values in a graph.

In step S925, the analysis device 120 determines whether the detailed display instruction has been received. When it is determined in step S925 that the detailed display instruction has been received (Yes in step S925), the process proceeds to step S926.

In step S926, the analysis device 120 reads out and displays the first sensor data that correspond to the difference value selected in the detailed display instruction.

Meanwhile, when it is determined in step S925 that the detailed display instruction has not been received (No in step S925), the process proceeds to step S927.

In step S927, the analysis device 120 determines whether to end the data checking processing. When it is determined in step S927 not to end the data checking processing (No in step S927), the process returns to step S922. Meanwhile, when it is determined in step S927 to end the data checking processing (Yes in step S927), the data checking processing is ended.

As clear from the descriptions above, the analysis device 120 according to the first embodiment

- divides the sensor data output from each sensor in the target apparatus according to the processing divisions (steps) of the processing (BKM recipe) executed by the target apparatus, and performs a statistical operation for each processing division,
- divides the sensor data output from each sensor of the comparative apparatus according to the processing divisions (steps) of the processing (BKM recipe) executed by the comparative apparatus, and performs a statistical operation for each processing division, and
- calculates a difference value of the results of the statistical operations for each processing division, and displays the difference value on the comparison result display screen.

In this way, since the operator does not need to check all of the enormous number of data points included in the sensor data in order to summarize the sensor data in units of the processing division, the operator may estimate the sensor data to be checked while looking through the entire sensor data.

Since the sensor data of the target apparatus and the sensor data of the comparative apparatus are meaningfully compared with each other in units of the processing division, it is possible to improve the accuracy for estimating the sensor data to be checked.

As a result, according to the analysis device 120 of the present embodiment, it is possible to improve the efficiency of the data checking task when the operator checks the sensor data output by each sensor in the target apparatus 110.

Second Embodiment

In the first embodiment, when graphs are displayed in the graph display field 704, the step name is placed on the horizontal axis, and the difference value is placed on the vertical axis. However, the method of displaying graphs in the graph display field 704 is not limited thereto. Hereinafter, a second embodiment will be described focusing on the differences from the first embodiment.

Figure 10:
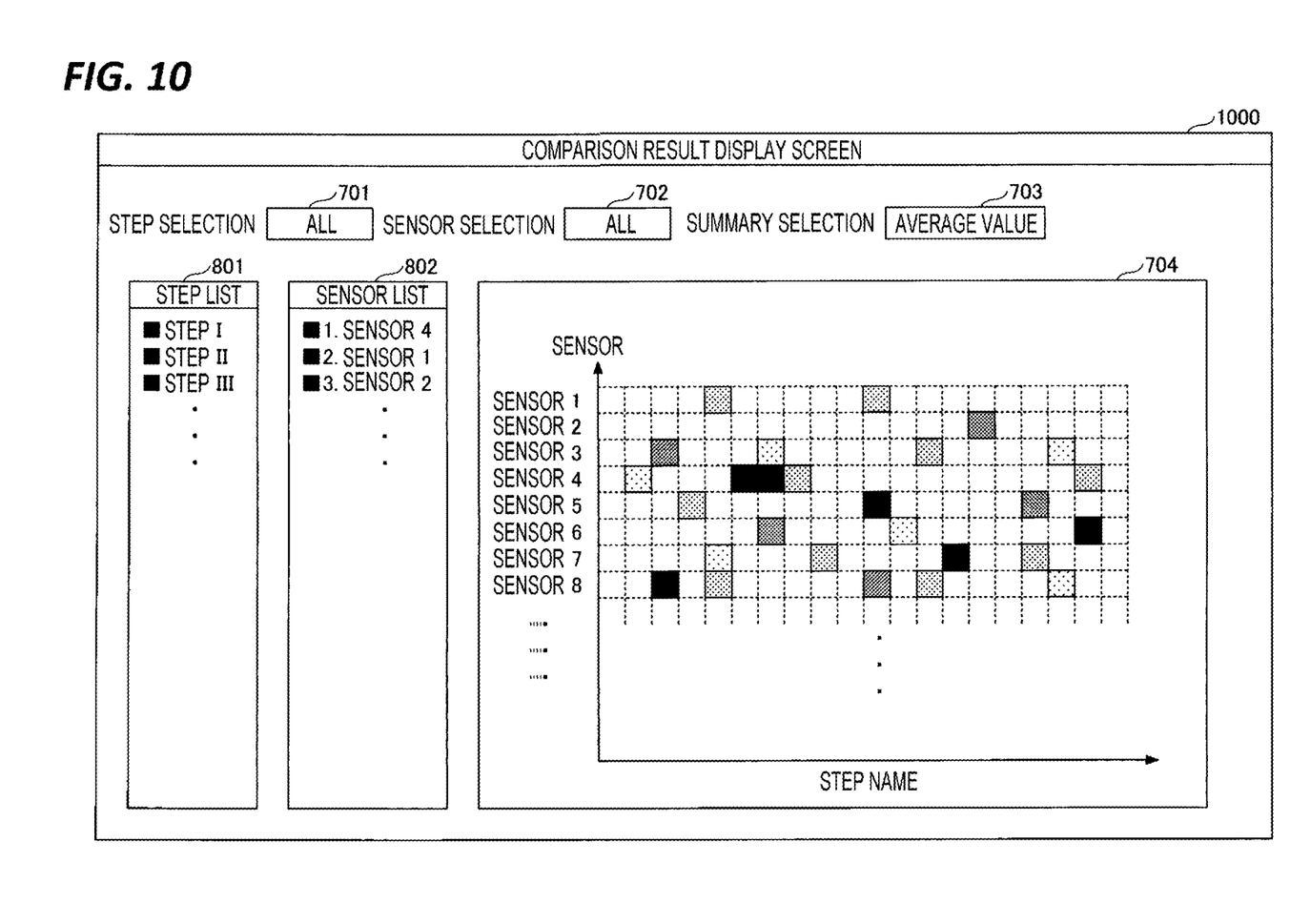
FIG. 10 is a second view illustrating an example of a display of graphs on the comparison result display screen.

FIG. 10 is a second view illustrating an example of the display of graphs on the comparison result display screen. The difference from the comparison result display screen 700 illustrated in FIG. 8 lies in that the graph display field 704 of the comparison result display screen 1000 illustrated in FIG. 10 represents the difference values in a heat map form.

Specifically, in the graph display field 704 of FIG. 10, the horizontal axis represents a step name that specifies each processing division (step) defined in the BKM recipe 420. In the graph display field 704, the vertical axis represents an identifier that identifies a sensor. Further, an area specified by a step name and an identifier is represented in a color (or shade) corresponding to a difference value.

In this way, by visualizing the difference values in the heat map form, the operator 130 may easily grasp a processing division of a sensor which has a relatively large difference value. Further, the operator 130 may estimate the sensor data to be checked while looking through the entire sensor data. As a result, according to the second embodiment, it is possible to improve the efficiency of the data checking task for checking data.

Third Embodiment

In the first and second embodiments described above, the minimum value, the maximum value, the average value, and the standard deviation are calculated as the statistical operation. However, the statistical operation is not limited thereto, and other statistical operations may be performed.

In the first and second embodiments described above, the sensor data is subjected to the statistical operation. However, the sensor data may be normalized, and then, subjected to the statistical operation.

In the first and second embodiments described above, the analysis device 120 is configured to be separated from the target apparatus 110. However, the analysis device 120 may be configured to be integrated with the target apparatus 110.

In the first and second embodiments described above, the analysis device 120 includes the target apparatus sensor data acquisition unit 301, the first statistical operation unit 302, the comparative apparatus sensor data acquisition unit 311, and the second statistical operation unit 312, the difference value calculator 321, and the display controller 322. However, some of the functions of the respective units included in the analysis device 120 may be implemented in the target apparatus 110 or the like. That is, the function of each unit included in the analysis device 120 may be implemented in any apparatus in the processing system 100.

For example, the target apparatus sensor data acquisition unit 301 and the first statistical operation unit 302 may be implemented in the target apparatus 110, and the comparative apparatus sensor data acquisition unit 311 and the second statistical operation unit 312 may be implemented in the comparative apparatus 111. In this case, the analysis device 120 acquires the first summary data from the target apparatus 110 and the second summary data from the comparative apparatus 111, so as to execute the difference value calculator 321 and the display controller 322.

In the first and second embodiments described above, the target apparatus and the comparative apparatus are substrate processing apparatuses that process substrates such as wafers. However, the target apparatus and the comparative apparatus may be processing apparatuses other than the substrate processing apparatuses.

According to the present disclosure, it is possible to provide a processing system and a processing method for improving the efficiency of a data checking task.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A processing system comprising:
a first statistical operator configured to divide first data output from each sensor of a target apparatus performing processing divisions of a processing, according to each processing division, and perform a statistical operation for each processing division;
a second statistical operator configured to divide second data output from each sensor of a comparative apparatus performing the processing divisions of the processing, according to each processing division, and perform a statistical operation for each processing division;
a calculator configured to calculate a difference value between a first result of the statistical operation performed by the first statistical operator and a second result of the statistical operation performed by the second statistical operator, for each processing division; and
a display controller configured to:
receive a processing division selection, a sensor selection, and a statistical operation selection; and
display the difference value for each processing division in a graph based on the processing division selection, the sensor selection, and the statistical operation selection.

2. The processing system according to claim 1, wherein the first statistical operator divides the first data output from each sensor of the target apparatus according to a first execution start timing and a first execution completion timing when the target apparatus executes each processing division of the processing, and
the second statistical operator divides the second data output from each sensor of the comparative apparatus according to a second execution start timing and a second execution completion timing when the comparative apparatus executes each processing division of the processing.

3. The processing system according to claim 2, wherein the first statistical operator performs a statistical operation of any one of a minimum value, a maximum value, an average value, and a standard deviation on the first data divided according to each processing division, for each processing division,
the second statistical operator performs a statistical operation of any one of a minimum value, a maximum value, an average value, and a standard deviation on the second data divided according to each processing division, for each processing division, and
the display controller displays any one of a difference value calculated based on data output from a selected sensor, a difference value calculated based on data divided according to a selected processing division, and a difference value calculated based on data on which a selected statistical operation is performed, in the graph, from the difference value for each processing division.

4. The processing system according to claim 3, wherein the display controller further displays the processing time required when the target apparatus executes each processing division of the processing, in the graph for each processing division.

5. The processing system according to claim 4, wherein the display controller further displays a time difference between the processing time required when the target apparatus executes each processing division of the processing and a processing time required when the comparative apparatus executes each processing division of the processing, in the graph for each processing division.

6. The processing system according to claim 4, wherein the target apparatus and the comparative apparatus are substrate processing apparatuses that process substrates.

7. The processing system of claim 2, wherein when the first statistical operator and the second statistical operator divide the first data and the second data of the target apparatus and the comparative apparatus, respectively, for each processing division,
the first execution start timing of the first data and the second execution start timing of the second data are different from each other for the same processing division.

8. The processing system according to claim 2, wherein the first statistical operator performs a statistical operation of any one of a minimum value, a maximum value, an average value, and a standard deviation on the first data divided according to each processing division, for each processing division, and
the second statistical operator performs a statistical operation of any one of a minimum value, a maximum value, an average value, and a standard deviation on the second data divided according to each processing division, for each processing division.

9. The processing system according to claim 1, wherein when any one difference value is selected from the difference value displayed in the graph for each processing division, the display controller displays data divided into a corresponding processing division of a sensor that corresponds to the selected difference value, among the first data output from each sensor of the target apparatus.

10. A processing method comprising:
dividing first data output from each sensor of a target apparatus performing processing divisions of a processing, according to each processing division, and performing a statistical operation for each processing division;
dividing second data output from each sensor of a comparative apparatus performing the processing divisions of the processing, according to each processing division, and performing a statistical operation for each processing division;
calculating a difference value between a first result of the statistical operation in the performing a statistical operation for the processing performed by the target apparatus and a second result of the statistical operation in the performing a statistical operation for the processing performed by the comparative apparatus, for each processing division;
receiving, by a display controller, a processing division selection, a sensor selection, and a statistical operation selection; and
displaying the difference value for each processing division in a graph based on the processing division selection, the sensor selection, and the statistical operation selection.

* * * * *